March 10, 1942.   E. F. HANNON, JR   2,275,960
FISHING APPARATUS
Filed June 17, 1940
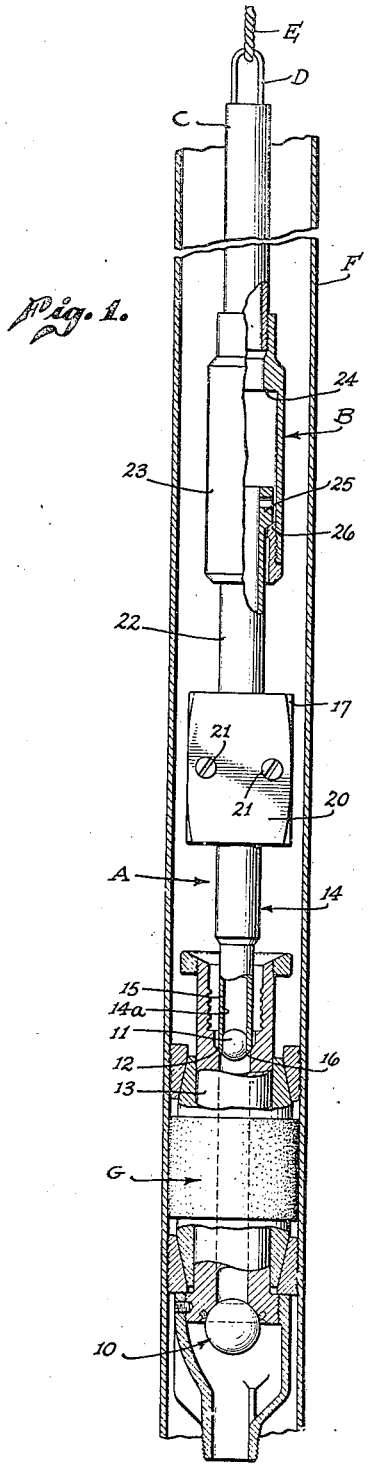
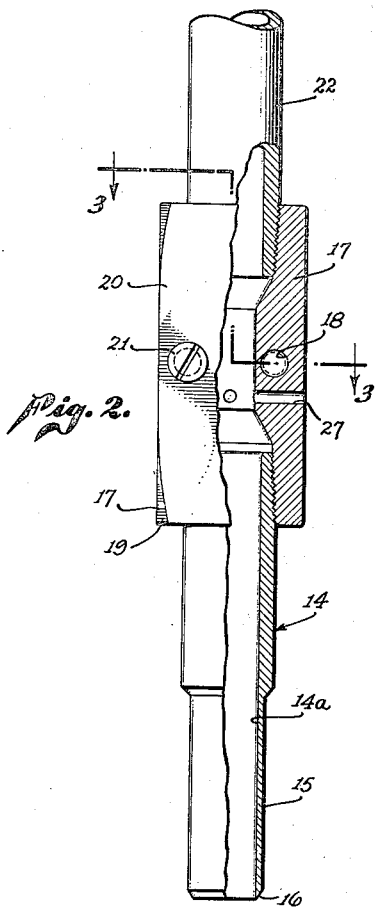
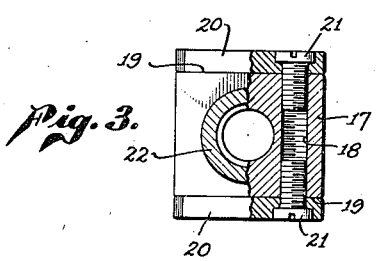
Inventor
EDWARD F. HANNON, JR.
By Oscar A. Mellin
Attorney Patented Mar. 10, 1942

2,275,960

UNITED STATES PATENT OFFICE 2,275,960

FISHING APPARATUS

Edward F. Hannon, Jr., Great Bend, Kans., assignor to Baker Oil Tools, Inc., Los Angeles, Calif., a corporation of California Application June 17, 1940, Serial No. 340,942

9 Claims. (Cl. 166—1)

This invention relates to fishing apparatus, being particularly concerned with apparatus adapted for retrieving parts in well bores or well casings.

The object of this invention is to provide a fishing apparatus specifically designed for retrieving a bridging ball or similar closure member from a device functioning as a bridge or plug within a well casing or bore, in order to permit passage of fluid through the device after removal of its closure member. In a more general sense, the invention contemplates an improved fishing apparatus capable of being lowered through a well bore or casing on the end of a wire line or tubular string for the purpose of forcibly grasping an object and bodily removing it to the surface of the well bore.

This invention has other objects that will become apparent from a consideration of the embodiment shown in the drawing accompanying and forming part of the present specification. This form will now be described in detail, but it is to be understood that such detailed description is not to be taken in a limited sense, since the scope of the invention is best defined by the appended claims.

Referring to the drawing:

Figure 1 is a longitudinal section through a well casing showing the fishing apparatus in operative position with respect to a well packer functioning as a bridge plug;

Figure 2 is a partial longitudinal section through part of the fishing apparatus; and Figure 3 is a section taken along the line 3—3 of Figure 2.

As shown in Figure 1, a fishing tool A is attached to an expansion joint or other jarring mechanism B, which in turn is secured to a joint of tubing C having a bail D at its upper end secured to a wire line E, by means of which the assembled device is lowered through a well casing F to a well packer or cement retainer G anchored therein. This retainer is usually provided with a back pressure valve 10 at its lower end for preventing upward passage of fluid through its body. When employed as a bridge plug, a bridging ball 11 or similar closure engages a bridging ball seat 12 at the upper part of the packer body 13 to prevent fluid passage therethrough in a downward direction.

With both the back pressure valve 10 and bridging ball 11 in engagement with their respective mating seats, fluid is incapable of flowing through the well packer G in either direction. If additional fluid is to be forced down through the well packer, it becomes essential that the upper bridging ball be removed. It is for this specific purpose that the present fishing apparatus has been designed, although other uses will become apparent to those skilled in the art.

The fishing tool A includes a tubular catcher 14 of steel or other relatively hard metal, whose lower part 15 is of reduced outside diameter having a bottom end 16 bevelled downwardly and inwardly to form a sharp edge capable of cutting its way over the bridging ball 11, which is usually made of some relatively soft material, such as zinc. The upper end of the catcher 14 is threaded into a guide body 17 serving to center the tool in the casing, in order to position the reduced lower part 15 of the catcher in the packer body 13 and its cutting end 16 over the coaxial bridging ball. This guide body 17 has a plurality of threaded holes 18 in its opposite faces 19, 19 to enable shims or side plates 20, 20 to be secured thereto by means of screws 21, for the purpose of increasing the transverse size of the guide 17, 20 and insure proper centering of the catcher 14 when the device is run in casings materially larger than the guide body itself.

The upper end of the guide body 17 threadedly receives the tubular mandrel 22 of the jar B, which is telescoped into a cooperable jar cylinder 23 secured to the joint of tubing C. When in completely collapsed condition, the cylinder head 24 will contact the mandrel head 25, outward movement of the mandrel being limited by engagement of its head with the cylinder seat 26. The purpose of the jar B is to deliver a blow to the fishing tool A after its knife edge 16 has contacted the bridging ball, while the joint of tubing C is furnished to increase the force of the blow imposed on the ball 11.

The assembled device is run in the casing on the end of the wire line E to the region of the bridge plug G, being centered within the casing by the guide 17, 20. The jar cylinder 23 is then allowed to drop over the jar mandrel 22, the connected joint of tubing C and cylinder gaining momentum and delivering a blow to the catcher 14 through the mandrel 22 and guide upon striking of the cylinder head 24 against the mandrel head 25. The force of this blow drives the bevelled end 16 of the catcher down over the bridging ball 11, cutting the outer portions of the ball away and wedging it firmly in the passage 14a through the catcher. The wire line E and device are then elevated and removed, together with the bridging ball, from the casing.

As many blows as are required to wedge the ball in the passage may be struck by elevating and dropping the jar cylinder through manipulation of the wire line.

It is to be noted that the guide body 17 is provided with bleeder holes 27 extending through its side walls which do not receive the plates 20, 20. These holes will allow any fluid within the tubing C and jars B to escape to the exterior of the assembled device, so as to prevent a hydrostatic head of fluid within the device from exerting sufficient pressure on the ball 11 to push it from the lower end 15 of the catcher.

Following removal of the bridging ball from the hole, a suitable tubular string (not shown) can be run in the casing and threadedly secured to the upper end of the well packer G, and fluid pumped through the body 13 and past the back pressure ball 10 to the desired point below the packer. After this operation has occurred, and if it is again desired to have the packer function as a bridge plug, another ball can be allowed to gravitate to the mating bridging ball seat 12 at the top of the packer.

I claim:

1. A well fishing tool, including a tubular catcher having a cutting edge at its bottom end, an adjustable guide secured to the upper end of the tubular catcher and adapted for engagement with casings of different inside diameters to center said tubular catcher therewithin, and jarring means secured to the guide.

2. A device of the character described, including a tubular catcher having a cutting edge at its bottom end capable of being forced over and cutting a bridging ball positioned on a well apparatus, a guide body secured to the upper end of the tubular catcher, plates detachably secured to opposite sides of said body, and inertia means secured to the upper end of the guide body.

3. A device of the character described, including a tubular catcher having a cutting edge at its bottom end capable of being forced over a bridging ball positioned on a well apparatus, a guide secured to the upper end of the tubular catcher, a mandrel secured to the upper end of the guide body, a cylinder telescoped over said mandrel and adapted to deliver a blow thereto, and a weight attached to the upper end of the cylinder.

4. A device of the character described, including a tubular catcher having a cutting edge at its bottom end, a guide secured to the upper end of the tubular catcher and adapted for engagement with a casing in which said device is to be run for centering said tubular catcher in said casing, and tubular inertia means secured to the upper end of said guide, said guide having a central passage communicable with the interior of said catcher and tubular inertia means, said guide having bleeder holes through its side wall to allow fluid to drain by gravity from the interior of said tubular inertia means and guide to the exterior thereof.

5. A device of the character described, including a tubular catcher having a cutting edge at its bottom end capable of being forced over a bridging ball positioned on a well apparatus, a generally hollow rectangular guide body secured to the upper end of the tubular catcher, plates detachably secured to two of the opposite sides of said body, said body having bleeder holes extending through one or more of the other sides of said body.

6. A device of the character described, including a tubular catcher having a cutting edge at its bottom end capable of being forced over a bridging ball positioned on a well apparatus, a hollow guide body secured to the upper end of the tubular catcher, plates detachably secured to two opposite sides of said body, said body having bleeder holes extending through one or more of its other sides, a mandrel secured to the upper part of said body, a cylinder telescoped over said mandrel, a tubular member secured to said cylinder, and a bail secured to the upper end of said member adapted for attachment to a wire line.

7. A device of the character described, including a tubular catcher having a reduced lower portion provided with a cutting edge at its bottom end capable of being forced over a bridging ball positioned on a well apparatus, a hollow guide body secured to the upper end of the tubular catcher, plates detachably secured to two opposite sides of said body, said body having bleeder holes extending through one or more of its other sides, a mandrel secured to the upper part of said body, a cylinder telescoped over said mandrel, a tubular member secured to said cylinder, and a bail secured to the upper end of said member adapted for attachment to a wire line.

8. A well fishing tool, including a tubular catcher having a cuting edge at its bottom end, a guide secured to the upper end of the tubular catcher for centering the same in a casing in which said device is adapted to be run, said guide having an open central passage always communicable with the interior of said catcher to permit flow of fluid therebetween in both directions, and bleeder holes for allowing fluid to drain by gravity from said guide.

9. A device of the character described, including a tubular catcher having a cutting edge at its bottom end capable of being forced over a bridging ball positioned on a well apparatus, a guide secured to the upper end of the tubular catcher, a mandrel secured to the upper end of the guide, and a cylinder telescoped over said mandrel for delivering a blow thereto.

EDWARD F. HANNON, Jr.